US008557919B2

(12) United States Patent
Song et al.

(10) Patent No.: US 8,557,919 B2
(45) Date of Patent: Oct. 15, 2013

(54) POLYMERIC FILMS AND METHOD OF MAKING SAME

(75) Inventors: Kwangjin Song, Pittsford, NY (US); Pang-Chia Lu, Pittsford, NY (US)

(73) Assignee: ExxonMobil Oil Corporation, Irving, TX (US)

( * ) Notice: Subject to any disclaimer, the term of this patent is extended or adjusted under 35 U.S.C. 154(b) by 77 days.

(21) Appl. No.: 13/126,310

(22) PCT Filed: Oct. 27, 2009

(86) PCT No.: PCT/US2009/062145
§ 371 (c)(1),
(2), (4) Date: Feb. 2, 2012

(87) PCT Pub. No.: WO2010/059343
PCT Pub. Date: May 27, 2010

(65) Prior Publication Data
US 2012/0157598 A1   Jun. 21, 2012

Related U.S. Application Data

(60) Provisional application No. 61/117,509, filed on Nov. 24, 2008.

(51) Int. Cl.
*B32B 3/10* (2006.01)
*C08G 63/00* (2006.01)
*C08L 67/02* (2006.01)

(52) U.S. Cl.
USPC ............ 525/165; 524/81; 525/437; 428/201; 528/308.1

(58) Field of Classification Search
USPC .......................................... 428/201
See application file for complete search history.

(56) References Cited

U.S. PATENT DOCUMENTS 4,377,616 A   3/1983   Ashcraft et al.
4,632,869 A   12/1986  Park et al.
(Continued)

FOREIGN PATENT DOCUMENTS

EP   0 695 778     2/1996
JP   06-214084    8/1994
(Continued)

OTHER PUBLICATIONS

Howard et al. (On the challenge of quantifying man made nanoparticles in the aquatic environment, Journal of Environmental Monitoring, vol. 12, p. 135-142, Nov. 2010).*

*Primary Examiner* — Randy Gulakowski
*Assistant Examiner* — Christopher M Rodd

(57) ABSTRACT

Provided are polymeric films that include a polyolefin and at least one cavitating agent including a poly(alkylene terephthalate) of formula (I);

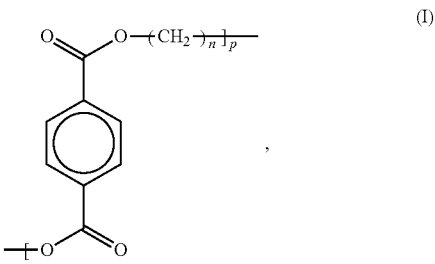

wherein n, representing the number of methylene segments in the repeating unit, is 3 or an integer greater than or equal to 5; p, representing the degree of polymerization, is an integer greater than 1. The polymeric film may be an opaque polymeric film. A preferred cavitating agent is poly(trimethylene terephthalate). Also provided are methods for making such polymeric films.

13 Claims, 3 Drawing Sheets

(a) PBT/250°C   (b) PBT/270°C   (c) PTT A/270°C   (d) PTT A/Nano/270°C

(56) References Cited

U.S. PATENT DOCUMENTS

| | | | |
|---|---|---|---|
| 4,720,416 A | | 1/1988 | Duncan |
| 4,741,950 A | | 5/1988 | Liu et al. |
| 4,758,462 A | | 7/1988 | Park et al. |
| 5,134,173 A | * | 7/1992 | Joesten et al. ............... 521/139 |
| 5,173,357 A | * | 12/1992 | Nakane et al. ............... 428/220 |
| 5,188,777 A | | 2/1993 | Joesten et al. |
| 5,573,717 A | | 11/1996 | Peiffer et al. |
| 5,866,246 A | | 2/1999 | Schreck et al. |
| 6,048,608 A | | 4/2000 | Peet et al. |
| 6,124,029 A | | 9/2000 | Schreck et al. |
| 6,528,155 B1 | | 3/2003 | Kong et al. |
| 6,719,940 B2 | | 4/2004 | Rounsley |
| 6,815,079 B2 | | 11/2004 | Rosenbaum et al. |
| 6,828,019 B2 | | 12/2004 | Kong et al. |
| 6,884,517 B2 | | 4/2005 | Peiffer et al. |
| 7,122,239 B2 | | 10/2006 | Bennett et al. |
| 2005/0245655 A1 | * | 11/2005 | Kelsey et al. ............... 524/394 |
| 2009/0191388 A1 | * | 7/2009 | McLeod et al. ............... 428/201 |

FOREIGN PATENT DOCUMENTS

| | | | | |
|---|---|---|---|---|
| JP | | 11152357 A | * 6/1999 | ............. B29C 55/14 |
| WO | WO 02/081207 | | 10/2002 | |

* cited by examiner (a) PBT/250°C  (b) PBT/270°C  (c) PTT A/270°C  (d) PTT A/Nano/270°C (a) 50/50% PP/PBT (b) 50/50% PP/PTT (c) 50/49/1% PP/PTT/RA

POLYMERIC FILMS AND METHOD OF MAKING SAME

CROSS-REFERENCE TO RELATED APPLICATIONS

This application is a National Stage Application of International Application No. PCT/US2009/062145 filed Oct. 27, 2009, which claims priority from U.S. Provisional Application Ser. No. 61/117,509 filed Nov. 24, 2008, the contents of both which are incorporated by reference in their entirety.

FIELD OF THE INVENTION

This disclosure relates to polymeric films such as those made from incompatible polymer blends. More particularly, this invention relates to polymeric films comprising a polyolefin and at least one cavitating agent that is a poly(alkylene terephthalate) such as poly(trimethylene terephthalate) ("PTT").

BACKGROUND OF THE INVENTION

Polymeric films such as opaque polymeric films are used in many applications including packaging or labeling materials, battery separator, filter, membrane, etc. Various organic and inorganic cavitating agents have been used in the production of opaque films. For example, organic materials such as polybutylene terephthalate ("PBT"), polyethylene terephthalate ("PET"), poly(ethylene 2,6-napthalate) ("PEN"), polycarbonate ("PC"), nylons, cross-linked polystyrene, syndiotactic polystyrene, acetals, acrylic resins, polyacrylate, poly(N-vinylcarbozole), polyvinylcyclohexane, polyvinyl chloride, polyacrylonitrile; and inorganic materials such as glass, metal, and ceramic have been described and/or claimed as cavitating agents, for example, in U.S. Pat. Nos. 4,632,869; 5,134,173; 5,573,717; 6,048,608; 5,866,246; and 6,528,155. Other cavitating agents include polymorphic crystals of polymers such as β-polypropylene, as disclosed in U.S. Pat. No. 6,828,019.

U.S. Publication No. 2009/0191388 discloses a biaxially oriented film that comprises polypropylene and either polytrimethylene terephthalate or polymethylpentene as a cavitating agent.

The presence of a cavitating agent in a layer of a film structure during orientation of the film structure induces voids within the polymeric material of the layer. The voids scatter light thereby causing the film structure to be translucent. Thus, a film containing such voids may be opaque. The voids may also impart the film structure with enhanced permeability to gas and moisture. An opaque polymeric film may be porous or nonporous.

Polar polymers, either crystalline such as PET or amorphous such as PC, are often used as a cavitating agent for polyolefin films because they create a high interfacial tension with the nonpolar polyolefin matrix, which promotes the formation of a well-dispersed multiphase morphology in-situ during extrusion that is suitable for voiding in the orientation process. However, polar polymers are hydrophilic, thus sensitive in general to hydrolytic breakdown, and readily degrade into lower molecular weight species when they are extruded with nonpolar polymers as a blend component.

The lower molecular weight species such produced are known to migrate to and build up on the surface of the processing apparatus, e.g., screws, barrel walls, melt pipes, screen packs, dies, etc. The build-up often sloughs off the metal surfaces and passes into the film as sizable deposits of hard, eggshell-type impurities. These impurities are one of the primary causes of film splitting during orientation and optical non-uniformity of films such as opaque film. In order to mitigate the hydrolytic breakdown, the polar cavitating agent polymer is generally dried thoroughly to a moisture level as low as 200 wppm or less before being extruded as a film.

In addition, film scraps and edge trim containing polar cavitating agent (e.g., PBT) polymers often cannot be recycled, even in small quantities, because of the high reactivity of the polar component with polar additives and catalysis residues. Thus, clean polyolefins, containing the lowest possible concentration of catalyst residues and impurities, are often used in the film manufacture to suppress unwanted reactions and degradation of the polar cavitating agent polymer.

A need still exists for a cavitating agent that allows for improved film opacity and machinability. Preferably, such a cavitating agent produces little or less extrusion plate-out or build-up on the processing apparatus; has little or less interaction with catalyst residues, inorganic fillers such as $TiO_2$, or other additives contained within the film, thus allowing for the recycling of film scraps and edge trim; and produces uniform voiding across the film width, reducing processing issues such as split, bumps, sagging, or curvature.

SUMMARY OF THE INVENTION

This disclosure relates to a polymeric film such as an opaque film comprising at least one layer, wherein said layer comprises a polyolefin polymer and at least one cavitating agent. The cavitating agent comprises a poly(alkylene terephthalate) of formula (I):

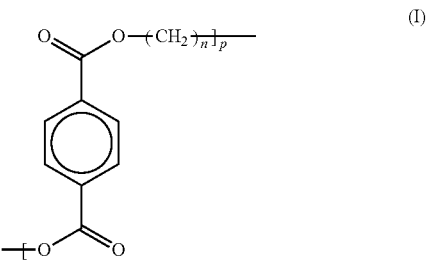

wherein n, representing the number of methylene segments in the repeating unit, is 3; p, representing the degree of polymerization, is an integer greater than 1; and the poly(alkylene terephthalate) has an intrinsic viscosity of less than or equal to 0.9 dl/g.

This disclosure also relates to a method for producing a polymeric film such as an opaque polymeric film. The method comprises the steps of extruding, e.g., through a flat sheet-forming die, at least one core layer comprising a polyolefin polymer and at least one cavitating agent comprising a poly(alkylene terephthalate) of formula I, wherein n is 3, p is an integer greater than 1, and the poly(alkylene terephthalate) has an intrinsic viscosity of less than or equal to 0.9 dl/g; optionally cooling the extrudate onto a chill cast roll and/or in a water bath; and orienting the film in at least one direction. The method may further comprise co-extruding at least one additional layer on at least one side of the core layer.

The cavitating agent may be in an amount of about 3 to about 60 wt. %, based on the weight of the layer. The poly(alkylene terephthalate) preferably has an intrinsic viscosity ("IV") of less than or equal to about 0.8 dl/g, and/or a glass transition temperature ("Tg") of greater than or equal to about 35° C. The polyolefin may comprise at least one of polypropylene, polyethylene, ethylene-propylene copolymers, propylene-butene copolymers, ethylene-propylene-butylene terpolymers, or blends thereof. The polymeric film may have a density that is at least about 10% less than the density of a film made from the same polyolefin without the cavitating agent. The polymeric film may have a density that is about 97% or less than the density of the polyolefin.

These and other features, aspects, and advantages of the present disclosure will become better understood with regard to the following description and appended claims.

DESCRIPTION OF THE PREFERRED EMBODIMENTS

Figure 1:
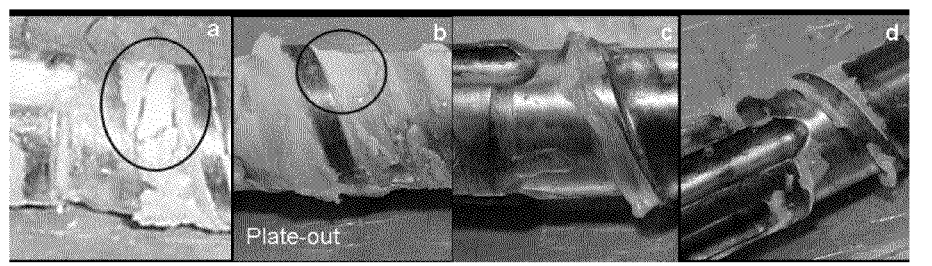
FIG. 1 contains images of plate-out on the extruder screw taken after 5 time repeated extrusions of a 50/50% blend of polypropylene/cavitating agent: (a) PBT as the cavitating agent, with the blend extruded at 250° C., (b) PBT as the cavitating agent, with the blend extruded at 270° C., (c) poly (trimethylene terephthalate) having an intrinsic viscosity of 0.82 dl/g ("PTT A") as the cavitating agent, with the blend extruded at 270° C., (d) PTT A and Nanoclay as the cavitating agent, with the blend extruded at 270° C.

The invention relates to a polymeric film comprising a cavitating agent that allows for improved film opacity and machinability. Preferably, such a cavitating agent produces little or less extrusion plate-out or build-up on the processing apparatus; has little or less interaction with catalyst residues, inorganic fillers such as $TiO_2$, or other additives contained within the film, thus allowing for the recycling of film scraps and edge trim; and produces uniform voiding across the film width, reducing processing issues such as split, bumps, sagging, or curvature.

Various specific embodiments, versions and examples of the invention are described, including preferred embodiments and definitions that are adopted herein for purposes of understanding the claimed invention. While the following detailed description gives specific preferred embodiments, those skilled in the art will appreciate that these embodiments are exemplary only and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

As used herein, the term "polymer" refers to the product of a polymerization reaction, and is inclusive of homopolymers, copolymers, terpolymers, etc.

As used herein, unless specified otherwise, the term "copolymer(s)" refers to polymers formed by the polymerization of at least two different monomers. For example, the term "copolymer" includes the copolymerization reaction product of propylene and an alpha-olefin (α-olefin), such as ethylene. However, the term "copolymer" is also inclusive of, for example, the copolymerization of a mixture of more than two monomers, such as, ethylene-propylene-butene.

As used herein, the term "intermediate" refers to the position of one layer of a multilayer film wherein said layer lies between two other identified layers. In some embodiments, the intermediate layer may be in direct contact with either or both of the two identified layers. In other embodiments, additional layers may also be present between the intermediate layer and either or both of the two identified layers.

As used herein, the term "incompatible" polymers refers to two or more polymeric blending partners, which are heterogeneous and phase distinct on a macroscopic level. On a molecular level, such polymers are partially or wholly immiscible, which form, when blended, a phase-separated morphology comprising two or more distinct heterogeneous phases, as described in "*Encyclopedia of Polymer Science and Engineering*", $2^{nd}$ Ed., V3, p. 758-760, Wiley, 1985; see also, e.g., FIG. 3.

Polymeric Film

The invention relates to polymeric films. The polymeric film, preferably an opaque polymeric film, comprises at least one layer, wherein said layer comprises at least one polyolefin and at least one cavitating agent which is incompatible, or has very low compatibility, with the polyolefin. In one embodiment, the polymeric film is a nonporous opaque polymeric film.

The at least one layer may comprise a continuous or essentially continuous phase of the polyolefin polymer and a dispersed and/or co-continuous phase of the cavitating agent. The cavitating agent creates isolated and/or interconnected voids within the layer when the film is oriented in at least one direction.

The polymeric film may be a single-layer film or a multilayer film. For example, the film may comprise a core layer, one or more skin layers on either side of the core layer, and/or one or more tie layers disposed between the core layer and the one or more skin layers. At least one layer of the polymeric film, preferably the core layer, comprises a film-forming polyolefin and a cavitating agent.

In one embodiment, the polymeric film has a density that is less than the density of the polyolefin contained within the layer which comprises the cavitating agent. If the layer comprises a blend of one or more polyolefins, the polymeric film preferably has a density that is less than the average density of the component polyolefins that comprise the cavitating agent. The polymeric film may have a density that is about 97% or less, about 95% or less, about 90% or less, about 88% or less, about 85% or less, about 80% or less, or about 70% or less, and preferably about 85% or less, more preferably about 70% or less, even more preferably about 60% or less, than the average density of the component polyolefin(s) constituting the cavitating agent containing layer. The polymeric film's density may be calculated by measuring the yield and volume of the film specimen. Yield is the measure of the film's coverage per unit weight, which is measured according to ASTM D-4321.

In another embodiment, the polymeric film has a density that is less than the density of a film made from the same polyolefin but that does not contain the cavitating agent. The polymeric film may have a density that is at least about 10% less, at least about 12% less, at least about 15% less, at least about 20% less, or at least about 30% less, and preferably at least about 10% less, more preferably at least about 30% less, than the density of a film made from the same polyolefin matrix resin but that does not contain any cavitating agent.

In other embodiments, the polymeric film has a density of less than or equal to about 0.70 g/cm$^3$, less than or equal to about 0.65 g/cm$^3$, less than or equal to about 0.60 g/cm$^3$, or less than or equal to about 0.58 g/cm$^3$, and preferably from about 0.50 g/cm$^3$ to about 0.70 g/cm$^3$, more preferably from about 0.50 g/cm$^3$ to about 0.60 g/cm$^3$.

In one embodiment, the polymeric film is an opaque polymeric film. An "opaque" polymeric film is a polymeric film that contains voids and has an opacity of greater than or equal to about 50% as determined by ASTM-589. In some embodiments, the opaque polymeric film has an opacity of greater than or equal to about 70%, or greater than or equal to about 80%, and preferably greater than or equal to about 60%.

In one embodiment, the polymeric film is an opaque polymeric film that has a high opacity and low light transmittance. Opacity is the opposite of transparency and is a function of the scattering and reflection of light transmitted through the film. Light transmittance is a function of light passing more directly through the film. Accordingly, a highly reflective film may provide high opacity while allowing light transmission.

In some embodiments, the opaque polymeric film has a light transmittance of less than or equal to about 50%, less than or equal to about 40%, less than or equal to about 35%, or less than or equal to about 28%, and preferably less than or equal to 40%. The film's light transmittance may be determined by ASTM D-1003.

The at least one layer in the polymeric film may comprise a compatibilizer that improves dispersion of the cavitating agent within the polyolefin matrix. A suitable compatibilizer may include polar modified polyolefin, comprising olefin polymers having a polar monomer copolymerized therein, olefin polymers or copolymers grafted therein with acids or anhydrides, or derivatives thereof. Exemplary polar modified polyolefins include, but are not limited to, acid or anhydride modified polyolefin, acid or anhydride modified polyolefin copolymers, glycidyl methacrylate modified polyolefin, glycidyl methacrylate modified polyolefin copolymer, ethylene acrylate copolymer, anhydride modified ethylene acrylate copolymer, acid terpolymer containing ester and acrylic functionalities, random terpolymer of ethylene, acrylic ester and glycidyl methacrylate, and blends thereof, as described in U.S. Publication No. 2006/0269755, the contents of which are incorporated herein by reference in their entirety.

The at least one layer may further comprise a chain extender that stabilizes the cavitating agent during the extrusion process. The chain extenders react with —OH and/or —COOH groups of the cavitating agent, thereby increasing the molecular weight of the cavitating agent and thus reducing the formation and build-up of low molecular weight degradation byproducts. Examples of suitable chain extenders include, but are not limited to, pyromellitic dianhydride, bisoxazolines such as 1,3-phenylenebisoxazoline and 1,4-phenylenebisoxazoline, diepoxides, carbony bis(1-caprolactam), carbodiimides, and blends thereof.

The polymeric film may further comprise one or more additives. Examples of useful additives include, but are not limited to, opacifying agents, pigments, colorants, slip agents, antioxidants, anti-fog agents, anti-static agents, anti-block agents, moisture barrier additives, gas barrier additives, hydrocarbon resins, hydrocarbon waxes, fillers such as calcium carbonate, diatomaceous earth and carbon black, and combinations thereof. Such additives may be used in effective amounts, which vary depending upon the property required. If the polymer substrate is a multilayer film, the additive(s) may be included in any one or more of the layers.

Polyolefin Polymer

The polymeric film includes a polyolefin in one or more layers. For example, the polyolefin may be at least one of polypropylene, polyethylene, ethylene-propylene copolymers, propylene-butene copolymers, ethylene-propylene-butylene terpolymers, or blends thereof. The polyolefin may be produced by Ziegler-Natta catalyst, metallocene catalyst, or any other suitable means.

Polyethylene for purposes of this disclosure may be high density polyethylene ("HDPE"), medium density polyethylene ("MDPE"), low density polyethylene ("LDPE"), linear low density polyethylene ("LLDPE"), and combinations thereof.

In one embodiment, the polymeric film comprises HDPE having a density of about 0.940 g/cm$^3$ or more, or preferably about 0.952 g/cm$^3$ or more. The HDPE may have a density in the range of about 0.952 to about 0.962 g/cm$^3$; and a melt index ("MI") in the range of about 0.001 to about 10.0 g/10 min, or preferably in the range of about 0.01 to about 2.0 g/10 min; and a crystalline melting temperature ("Tm") in the range of about 130 to about 148° C.

In another embodiment, the polymeric film comprises MDPE having a density in the range of about 0.926 to about 0.940 g/cm$^3$.

In another embodiment, the polymeric film comprises LDPE having a density of about 0.926 g/cm$^3$ or less, or in the range of 0.89 to 0.93 g/cm$^3$, and a MI of about 7 g/10 min, or in the range of about 6 to about 9 g/10 min.

In a further embodiment, the polymeric film comprises LLDPE having a density in the range of about 0.90 to about 0.94 g/cm$^3$, or more preferably in the range of about 0.910 to about 0.926 g/cm$^3$. The LLDPE may have a MI in the range of about 1 to about 10 g/10 min. The LLDPE may be a copolymer of ethylene and a minor amount of a higher olefin comonomer containing 4 to 10 carbon atoms, such as for example, butene-1, hexene-1, or octene-1.

Polypropylene for purposes of this disclosure may have a MFR in the range from about 0.001 to about 10 g/10 min, or preferably about 0.01 to about 5 g/10 min, selected from isotactic polypropylene ("iPP"), syndiotactic polypropylene ("sPP"), high crystalline polypropylene ("HCPP"), beta-nucleated polypropylene ("β-PP"), and blends thereof. Preferred polypropylenes have a crystallinity in the range of about 30 to about 80% and a Tm in the range of about 140 to about 170° C.

The iPP may have an isotacticity of about 89% or greater, preferably about 90% or greater, as measured by the fraction of mesopentad ("m-pentad") with $^{13}$C-NMR. The mesopentad fraction refers to the portion of isotactic conformation in the entire conformation. The sPP may have a syndiotacticity of about 89% or greater, as measured by the fraction of racemic pentads ("r-pentad") with $^{13}$C-NMR. The mean length of the syndiotactic sequences may be greater than 20 and preferably, greater than 25.

Polypropylene copolymers, if used in the polymeric film, may include one or more comonomers. For example, ethylene-propylene copolymers for purposes of this disclosure may have a MFR of less than or equal to about 10 g/10 min, comprising ethylene propylene mini-random copolymer, ethylene propylene random copolymer, ethylene-propylene block copolymers, and blends thereof. Preferably, the comonomer is selected from one or more of ethylene or butene. In such co- or terpolymers, the propylene monomer is generally present at greater than or equal to about 90 wt. %.

In a preferred embodiment, the polyolefin polymer is at least one of HDPE, iPP, HCPP, β-PP, ethylene-propylene copolymers, or blends thereof.

In a yet preferred embodiment, the polyolefin polymer is β-PP, as described in U.S. Pat. No. 6,828,019, the contents of which are incorporated herein by reference in their entirety. Beta nucleation includes creating beta-form crystals of polypropylene comprising a beta-crystalline nucleating agent. Substantially any beta-crystalline nucleating agent ("beta nucleating agent" or "beta nucleator") may be used, as described in U.S. Pat. Nos. 4,386,129; 4,975,469; 5,681,922; 5,231,126; 5,491,188; 6,235,823; and 6,005,034. The amount of beta nucleators to be used may be from about 0.0002 to about 8 wt. %, and preferably about 0.01 to about 2 wt. %, based on the weight of polypropylene.

Cavitating Agent

At least one layer of the polymeric film comprises at least one cavitating agent. In embodiments where the polymeric film, such as an opaque polymeric film, is a multilayer film, the cavitating agent is preferably added to the core layer. The cavitating agent is incompatible, or has very low compatibility, with the polyolefin(s) constituting the layer(s) to which the cavitating agent is added, at the temperatures of extrusion and orientation.

The cavitating agent comprises a poly(alkylene terephthalate) of formula I:

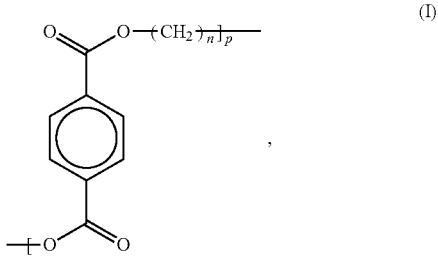

(I)

wherein n, representing the number of methylene segment in the repeating unit, is 3 or an integer greater than or equal to 5; p, representing the degree of polymerization, is an integer greater than 1. The degree of polymerization p is determined in such a way that the poly(alkylene terephthalate) has an intrinsic viscosity of less than or equal to about 10 dl/g.

In some embodiments, n=2m+1, wherein m is an integer greater than or equal to 1. In some embodiments, n may be 3 or an integer in the range of 5 to 30, 5 to 20, or in the range of 5 to 10. In a preferred embodiment, n is 3.

In a preferred embodiment, the cavitating agent comprises poly(trimethylene terephthalate) of formula I:

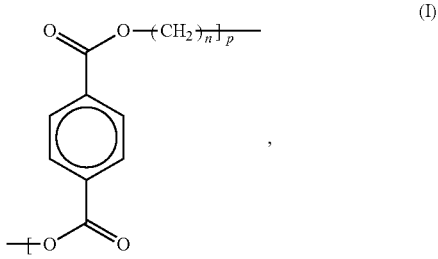

(I)

wherein n is 3, p is an integer greater than 1, and the poly (trimethylene terephthalate) has an intrinsic viscosity of less than or equal to 0.9 dl/g.

PTT is a condensation polymer and may be prepared by polymerizing aliphatic or aromatic diacid or diester with 1,3-propanediol under suitable process condition such as those described in U.S. Pat. Nos. 6,093,786 and 7,396,896. The 1,3-propanediol monomer may be produced by a fermentation process where corn sugars and other renewable resources are fermented. The invention herein is not limited by the preparation methods of PTT or its monomers.

The cavitating agent may have an intrinsic viscosity of less than or equal to about 10 dl/g, less than or equal to about 7 dl/g, less than or equal to about 5 dl/g, less than or equal to about 2 dl/g, less than or equal to about 1.5 dl/g, less than or equal to about 1 dl/g, or less than or equal to about 0.9 dl/g, as determined by ASTM D-2857. Preferably, the cavitating agent has an IV in the range of about 0.25 dl/g to about 5 dl/g, about 0.4 dl/g to about 2 dl/g, or in the range of about 0.6 dl/g to about 1.5 dl/g.

Preferably, the poly(trimethylene terephthalate) has an intrinsic viscosity of less than or equal to 0.9 dl/g, less than or equal to about 0.8 dl/g, or in the range of about 0.25 to about 0.8 dl/g, more preferably in the range of about 0.3 to 0.7 dl/g.

The cavitating agent may have a Tg greater than or equal to about 0° C., greater than or equal to about 20° C., greater than or equal to about 25° C., or greater than or equal to about 35° C. Preferably, the Tg is in the range of about 20° C. to about 100° C., about 25° C. to about 60° C., or in the range of about 30° C. to about 55° C., as determined by ASTM D-3418. In a preferred embodiment, the cavitating agent is PTT and has a Tg greater than or equal to about 35° C. and an upper processing limit temperature of about 270° C. or more.

The cavitating agent may crystallize rapidly and possess a high surface tension that allows it to be well dispersed and thus to form stable particles or phases within the polyolefin matrix of the layer. The cavitating agent may have a surface tension of about 35 dynes/cm or greater, about 40 dynes/cm or greater, or about 45 dynes/cm or greater, as determined by ASTM D-2578.

In some embodiments, the cavitating agent comprises at least one poly(alkylene terephthalate) of formula (I) wherein n is an integer in the range of 5 to 30, 5 to 20, or in the range of 5 to 10; and p is an integer greater than 1. In some embodiments, the cavitating agent is a blend of PTT and at least one other poly(alkylene terephthalate) of formula (I) wherein n is an integer in the range of 5 to 30, 5 to 20, or in the range of 5 to 10; and p is an integer greater than 1. The amount of poly(alkylene terephthalate) to be blended is not particularly limited and may be from about 5 to about 60 wt. %, or preferably from about 5 to about 30 wt. %, based on the total weight of the cavitating agent.

The cavitating agent may further comprise one or more other cavitating agents selected from the group of organic and inorganic materials including, for example, polybutylene terephthalate ("PBT"), polyethylene terephthalate ("PET"), polyethylene 2,6-napthalate) ("PEN"), polycarbonate, polycarbonate alloy, nylon, cross-linked polystyrene, syndiotactic polystyrene, acetal, acrylic resins, polyacrylate, poly(N-vinylcarbozole), polyvinylcyclohexane, polyvinyl chloride, polyacrylonitrile, cyclic olefinic polymer, aliphatic polyketone, poly(4-methyl-1-pentene), ethylene vinyl alcohol copolymers, polysulfones, cross-linked polystyrene, cross-linked silicone polymers, solid or hollow pre-formed glass or polymer spheres, metal beads or spheres, ceramic spheres, calcium carbonate, talc, chalk, or combinations thereof. The amount of other cavitating agents when present is not particularly limited and may be from about 1 to about 60 wt. %, or preferably from about 5 to about 30 wt. %, based on the total weight of the cavitating agent.

A preferred other cavitating agent is a cyclic olefinic polymer selected from a cyclic olefin homopolymer ("COH"), a cyclic olefin copolymer ("COC"), and blends thereof. COC is a copolymer comprising two monomers; one monomer being a cyclic olefin, such as a $C_4$ to $C_{12}$ cyclic olefin or norbornene, and the second monomer being an aliphatic olefin, such as ethylene, propylene, and butylene. The COC copolymer can be random, block, grafted, or any possible structure, having at least one co-monomer in the chain backbone.

The cavitating agent may further comprise nanoparticles which are organic or inorganic in character in an amount in the range of about 0.5 to about 20 wt. %. Suitable examples include, but are not limited to, nanoclays, rigid polymers having a Tg of greater than or equal to about 150° C., cross-linked polymers, metals, metal complexes such as metal oxides or nitrides, carbon nanotubes, ceramics, ceramic complexes, and combinations thereof. The nano-particles may help to increase the modulus, rigidity and thermal property of the cavitating agent and thus to improve the voiding performance of the cavitating agent.

The amount of the cavitating agent to be incorporated is not particularly limited and may correspond to the desired degree of void formation upon stretching. The polymeric film may comprise a cavitating agent or a blend of cavitating agents in an amount in the range of about 0.5 to about 70 wt. %, or about 1 to about 60 wt. %, and preferably about 3 to about 60 wt. %, preferably about 5 to about 50 wt. %, more preferably about 5 to about 40 wt. %, more preferably about 5 to about 30 wt. %, and most preferably about 5 to about 20 wt. %, based on the total weight of the layer to which the cavitating agent is added.

Film Structure

The polymeric film may be a single-layer film or a multi-layer film. In embodiments where the polymeric film is a single-layer film, the single-layer comprises a film-forming polyolefin and a cavitating agent.

In embodiments where the polymeric film is a multi-layer film, the cavitating agent may be in one or more layers of the film and preferably, in the core layer. The multilayer film may comprise a core layer, one or more skin layers on either side of the core layer, and/or one or more tie layers disposed between the core layer and the one or more skin layers. The skin layer is an optional layer and generally the outermost layer of the multilayer film when present. Two outermost skin layers may be disposed on opposite sides of the core layer. The skin layer(s) may be contiguous to the core layer or alternatively, to one or more other layers, such as, a tie layer described below.

The skin layer(s) may comprise one or more of the film-forming polyolefins or polymers that provide a desired functionality to the film. For example, one or both of the skin layers may be provided to improve the film's barrier properties, processability, printability, or compatibility for metallization, coating, or lamination to other films or substrates.

The multilayer film may further comprise one or more tie layers disposed generally intermediate the core layer and the one or more skin layers. The tie layer may comprise one or more of the film-forming polymers or an adhesion promoting material such as polar modified polyolefin, as described in U.S. Publication No. 2006/0269755.

One or both of the outer exposed surfaces of the polymeric film may be surface-treated to increase the surface energy of the film to render the film receptive to metallization, coatings, printing inks, and/or lamination. The surface treatment can be carried out according to one or more of the treatment methods known in the art. Preferred treatment methods include, but are not limited to, corona discharge, flame treatment, plasma treatment, chemical treatment, treatment by means of a polarized flame, and combinations thereof.

One or both of the outer exterior surfaces of the multilayer film may be metallized. Generally, the metallized layer is deposited on one of the outer skin layers. If no skin layer is present, then the surface of a core layer may be metallized. Such layers may be metallized using conventional methods, such as vacuum deposition of a metal layer such as aluminum, copper, silver, chromium, or mixtures thereof. In one embodiment, the exterior surface of the film may be treated first, for example, by flame during manufacturing, and then treated again in the metallization chamber, for example, by plasma immediately prior to being metallized.

One or more coatings for barrier, printing, and/or processing may be applied to one or both of the outer surfaces of the film. Such coatings may include acrylic polymers, such as ethylene acrylic acid ("EAA"), ethylene methyl acrylate copolymers ("EMA"), polyvinylidene chloride ("PVdC"), poly(vinyl)alcohol ("PVOH"), ethylene(vinyl)alcohol copolymer ("EVOH"), and combinations thereof. The coatings are preferably applied by an emulsion coating technique, but may also be applied by co-extrusion and/or lamination. The coating composition may be applied to the film as a solution or by any other conventional manner such as gravure coating, roll coating, dipping, spraying, and the like. Any excess aqueous solution can be removed by squeeze rolls, doctor knives, and the like. The film can be stretched in the MD, coated with the coating composition and then stretched perpendicularly in the TD. The coating can also be carried out after the completion of biaxial orientation.

An intermediate primer coating may also be applied to the film before it is coated. Examples of useful primer materials are well known in the art and include, but are not limited to, epoxy and poly(ethylene imine) materials. The primer provides an overall adhesively active surface for thorough and secure bonding with the subsequently applied coating composition. The primer may be applied to the film by conventional solution methods, for example, roller application.

Application

Polymeric films of the invention such as an opaque polymeric film may be useful as substantially stand-alone film webs or be coated, metallized, and/or laminated to other film structures.

The invention also relates to an article of manufacture comprising the polymeric film disclosed herein, including polymeric film prepared by processes described herein. The polymeric film may be used as a flexible packaging film to package an article or good, such as a food item or other products. In some applications, the polymeric film may be formed into a pouch type of package useful for packaging a beverage, liquid, granular, or dry-powder product. The polymeric film may also be used in labeling or shrinkage applications. In other applications, the polymeric film may be used as a battery separator, filter, or membrane.

Method of Preparation

The polymeric films according to the present disclosure may be prepared by any suitable means. In one embodiment, the method for producing a polymeric film such as an opaque polymeric film comprises the steps of extruding, e.g., through a flat sheet-forming die, at least one core layer comprising a polyolefin polymer and at least one cavitating agent comprising a poly(alkylene terephthalate) of formula I, wherein n is 3 or an integer greater than or equal to 5, p is an integer greater than 1, and the poly(alkylene terephthalate) has an intrinsic viscosity of less than or equal to 0.9 dl/g; optionally cooling the extrudate onto a chill cast roll and/or in a water bath; and orienting the film in at least one direction. The method may further comprise the steps of co-extruding at least one additional layer on at least one side of the core layer. Preferably, a multilayer film is co-extruded, cast, oriented, and then prepared for its intended use such as coating, printing, slitting, or other converting methods.

The film may be formed by extruding the at least one core layer comprising a polyolefin and a cavitating agent through a flat sheet extrusion die at temperatures in the range of 200 to 260° C., cooling the sheet onto a chill cast drum and/or in a water bath, and then stretching the cast sheet 3 to 7 times its original length in the MD followed by stretching 4 to 10 times its original width in the TD. The biaxially stretched film is then wound onto a reel. One or both of the external surfaces may be coated and/or flame or corona treated before winding. Preferably, other layers such as one or more skin layers, and one or more tie layers, may be co-extruded with the core layer to form a multi-layer film.

The preparation method may further comprise the steps of enclosing a product or article within at least a portion of the co-extruded film, engaging a first portion of the skin layer with a second portion of the skin layer at a seal area, and applying pressure and heat at the seal area, optionally for a determined duration of time, to cause the first portion to engage with the second portion to create at least one of a fin seal, a lap seal, and a crimp seal in the seal area.

While the illustrative embodiments have been described with particularity, it will be understood that various other modifications will be apparent to and can be readily made by those skilled in the art without departing from the spirit and scope of the disclosure. To the extent that this description is specific, it is solely for the purposes of illustrating certain embodiments of the disclosure and should not be taken as limiting the present inventive concepts to those specific embodiments. Accordingly, it is not intended that the scope of the claims appended hereto be limited to the examples and descriptions set forth herein, but rather that the claims should be construed as encompassing all the features of patentable novelty which reside in the present disclosure, including all features which would be treated as equivalents thereof by those skilled in the art to which the disclosure pertains.

EXAMPLES

Polymeric films in accordance with the invention are further described with reference to the following non-limiting examples.

Test Procedure

When applicable, standard ASTM tests were used to determine the properties of the component materials employed and the Example films produced herein.

The melt index ("MI") and melt flow rate ("MFR") were measured according to ASTM D-1238, wherein one minute preheat on the sample to provide a steady temperature for the duration of the experiment was used. Measurement conditions were 190° C. and 2.16 Kg for polymers having Tm less than or equal to about 150° C. such as polyethylene; 230° C. and 2.16 Kg for polymers having Tm less than or equal to about 200° C. such as polypropylene and propylene co- or terpolymers; and 2.16 Kg and 260° C. for polymers having Tm greater than about 200° C. such as PTT and poly(butylene terephthalate) polymers. The measured unit of MI and MFR was expressed in g/10 min.

The intrinsic viscosity was measured by an Ostwald-Cannon-Fenske series 50 viscometer at 25° C. per the ASTM D-2857 test method. A 0.32 wt. % of the polymer sample was dissolved in a mixed solvent of 25% by volume trifluoroacetic acid and 75% by volume methylene chloride.

The density of the polymer resin was measured per the ASTM D-792 test method. The densities of polypropylene homopolymers and biaxially oriented polypropylene films that do not contain any cavitating agent are both to be measured to be about 0.90 g/cm$^3$.

The thicknesses of the film and the film's layers were measured respectively using an optical gauge Model #283-20 available from Beta LaserMike and JSM 6400 scanning electron microscopy (SEM) from Jeol.

The density of the film was calculated by measuring the yield and volume of the film specimen. Yield is the measure of the film's coverage per unit weight, which is measured according to ASTM D-4321.

Glass transition temperature, perrcent crystallinity ("% Xc") and Tm of the polymer were measured according to ASTD D-3418 with Differential Scanning calorimeter (DSC, Perkin Elmer Pyris 1 Thermal Analysis System). Polymer sample of 15 to 20 mg, equilibrated to 25° C., was heated beyond its Tm and then cooled to 25° C. at a rate of 10° C./min. The sample was allowed to equilibrate for 3 minutes and then reheated again beyond its $T_m$ at a rate of 10° C./min. The thermal output, recorded as the area under the melting peak, is a measure of the heat of fusion. The melting temperature is defined as the point where during the second melting of the sample, the peak endothermic heat flow required to maintain the heating rate of 10° C./min is observed.

Opacity represents a substrate's light blocking ability. The test measures two reflectance values, using Technidyne BNL-3 Opacimeter and following ASTM D-589.

Light transmittance is the percentage of incident light that passes through a film, and is measured according to ASTM D-1003 with a BKY-Garner XL-211 haze-guard plus hazemeter.

The micrographic images of scanning electron microscopy (SEM) were taken with Jeol JSM 6400. Fresh cross-section surfaces were prepared by freeze fracturing the sample perpendicular and parallel to the MD at −130° C. using liquid nitrogen. The fresh surfaces were subsequently coated with platinum using a vacuum sputter. SEM images were then taken at an acceleration voltage 25 KV.

The degree of build-up of the cavitating agent during extrusion was examined by a 5 pass repeated extrusion test. A single screw extruder of Table Top Extruder™ (serial #2036), Yellow Jacket Extrusion Equipment LLC, NJ, USA was used. The extruder had three barrels, a barrier type screw of 2.54 cm diameter having a length to diameter ratio (L/D) of 30, and a melt pipe of 50 cm long that was equipped with 0.32 cm circular die and 250 mesh screen pack. For each example, 50/50 wt % blends of polypropylene/cavitating agent were used to accelerate material build-up onto the machine. The extruder ran at 100 rpm respectively at 240 to 270° C. producing a total output of 4.54 Kg/hr. The sample blends of polypropylene and cavitating agents were dried to a moisture level of 100 wppm or less prior to each pass extrusion. After 5 pass extrusions, the extruder screw was removed from the machine and then the degree of material build-up was visually examined and rated as follow: a rating of 1 indicates that amount of build-up which filled the screw channel was less than about 5%; a rating of 2 in the range of about 5% to about 15%; a rating of 3 in the range of about 15% to about 30%; a rating of 4 in the range of about 30% to about 50%; and a rating of 5 greater than about 50%. The results of these accelerating tests with 50/50% blend ratios are shown in TABLE C and TABLE 4.

$$\text{Amount of Buildup}(\%) = \frac{\text{Volume of the Total Buildup}}{\text{Volume of the Total Screw Channels Containing Buildup}} \times 100$$

FIG. 1 contains images of build-up on the extruder screw. The figure shows the extruder screw after the 5 pass extrusion test using a 50/50 wt. % blend of polypropylene/cavitating agent. In part (a) the figure shows the extruder screw where PBT was used as the cavitating agent, with the blend extruded at 250° C., resulting in build-up rated as 5. In part (b) the figure shows the extruder screw where PBT was used as the cavitating agent, with the blend extruded at 270° C., resulting in build-up rated as 5. In part (c) the figure shows the extruder screw where PTT A was used as the cavitating agent, with the blend extruded at 270° C., resulting in mild build-up rated as 3. In part (d) the figure shows the extruder screw where a 90/10 wt. % blend of PTT A/nanoclay Cloisite® 15A was used as the cavitating agent at extrusion temperatures of 270° C., resulting in build-up rated as 2.

Figure 2:
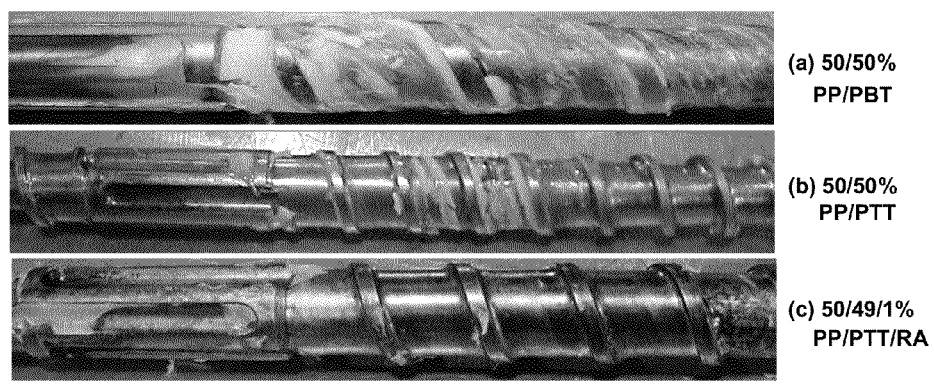
FIG. 2 contains images of plate-out on the extruder screw taken after 5 time repeated extrusions of polyolefin/cavitating agent blends: (a) 50/50 wt. % PP4612/PBT Valox™ 295, (b) 50/50 wt. % PP4612/Sorona® PTT, and (c) 50/49/1 wt. % PP4612/Sorona® PTT/Irgamod RA20.

FIG. 2 contains the images of build-up on the extruder screw. The degree of build-up during extrusion was examined in the same manner described above, except that the test extruder ran at extrusion temperatures of around 260° C. In part (a) the figure shows the extruder screw where PBT was used as the cavitating agent, resulting in build-up rated as 5. In part (b) the figure shows the extruder screw where Sorona® PTT was used as the cavitating agent, resulting in build-up rated as 3. In part (c) the figure shows the extruder screw where a 50/49/1 wt. % blend of PP/Sorona® PTT/Irgamod RA20 was extruded, resulting in build-up rated as 2.

Examples A-G

Comparative Example A is a film without any cavitating agent. Comparative Example B is a film containing poly(1,4-butylene terephthalate) ("PBT") as a cavitating agent. The PBT has a Tg of about 30° C., Tm of about 225° C., and an upper processing limit temperature of about 260° C. In Examples C-G, "PTT A" is a poly(trimethylene terephthalate) having an intrinsic viscosity of 0.82 dl/g, and "PTT B" is a poly(trimethylene terephthalate) having an intrinsic viscosity of 0.79 dl/g. The PTT has a Tg of about 40° C., a Tm of about 228° C., and an upper processing limit temperature of about 270° C. A listing of other components used in Examples A-G is in TABLE A.

TABLE A

| Components | | |
|---|---|---|
| Component | Description | Commercial Source |
| Equistar XM6030A | High density polyethylene ("HDPE") | Equistar Chemicals |
| PP4612 | Polypropylene ("PP") | ExxonMobil Chemical Company |
| Ti-Pure R-104 | Titanium dioxide ("TiO$_2$") | DuPont Company |
| Valox ™ 295 | Poly(1,4-butylene terephthalate) ("PBT") | Sabic |
| JPP XPM 7510 | Ethylene-butene-propylene terpolymer ("EPB") | Japan Polypropylene Company |
| TOPAS ™ 4000 series. | Cyclic olefinic copolymer of ethylene and norbornene ("COC"). | TOPAS Advanced Polymers, Inc. |
| Cloisite ® 15A | Nanoclay | Southern Clay Products, Inc. |

Various co-extruded biaxially oriented films were made and tested. The films were 5-layer films, coextruded using 5 single screw extruders having a total output of about 230 Kg/hour. The polymers were melted and coextruded at 250° C., quenched on a casting chill roll which was maintained at 30° C. The cooled extrudate was then stretched 5.5 times in the machine direction at 120° C. using the combination of slow and fast speed roller. The film was then further stretched 8.0 times in the transverse direction at 160° C. An example of a representative film structure is shown in TABLE B. Sample films were made with varying cavitating agents, and the density, light transmittance, and opacity of each film were tested, with the results shown in TABLE C.

TABLE B

| Representative Structure of Example Films | | | |
|---|---|---|---|
| Layer | Composition | Polymer | Thickness of Layer |
| Skin | 100% | HDPE | 0.8 μm |
| Tie | 96/4% | Polypropylene/TiO$_2$ | 4.1 |
| Core | 95/5% | Polypropylene/Cavitating Agent | 12.7 |
| Tie | 96/4% | Polypropylene/TiO$_2$ | 4.1 |
| Skin | 100% | EPB Terpolymer | 0.8 |

TABLE C

| Properties and Degree of Build-Up | | | | | |
|---|---|---|---|---|---|
| Example | Cavitating Agent | [wt %] | Light Transmittance [%] | Opacity [%] | Density [g/cm$^3$] | Build-Up* |
| Cx. A | / | / | 95.0 | 6.7 | 0.905 | 1 |
| Cx. B | PBT | 6% | 28.2 | 79.1 | 0.566 | 5 |
| Ex. C | PTT B | 6% | 28.5 | 79.5 | 0.581 | 3 |
| Ex. D | PTT A | 6% | 27.7 | 81.6 | 0.574 | 3 |
| Ex. E | PTT A/PBT | 3/3% | 28.0 | 80.5 | 0.575 | 3 |
| Ex. F | PTT A/COC | 3/3% | 21.2 | 83.5 | 0.562 | 3 |
| Ex. G | PTT A/Nano | 6% | 27.5 | 87.5 | 0.571 | 2 |

*50/50 wt % polypropylene/cavitating agent.

As shown in TABLE C, the densities and optical properties of the Example films containing HT (Ex. C-G) were comparable to the Comparative Example film containing PBT (Cx. B). Examples C-G exhibited superior physical properties, that is, low density, low light transmittance and high opacity, as compared to Comparative Example A without any cavitating agent. In addition, Examples C-G containing PTT produced much less build-up than Comparative Example B containing PBT.

Examples 1-22

PTT used in the following examples is poly(trimethylene terephthalate) having an intrinsic viscosity of 0.92 dl/g, 0.82 dl/g, or 0.79 dl/g, as set forth in TABLE 1. A listing of other components used in Examples 1-22 is also included in TABLE 1.

The examples were a biaxially stretched 5-layer film, which was co-extruded with 5 single screw extruders having a total output of about 230 Kg/hour. The cavitating agents were dried before being fed into extruder to a moisture level of about 100 wppm or less and then subsequently pellet blended with the polyolefin for the core layer. The polymers were extruded at 250° C. through a coathanger die, and then quenched on a chill casting roll and in a water bath that were maintained at temperatures of around 30° C. The cooled extrudate was then stretched at 120° C. or lower 5.0 to 5.5 times in the machine direction (MD) using the combination of slow and fast speed rollers. Subsequently, the film was further stretched at 162° C. or lower 7 to 12 times in the transverse direction (TD) using the tenter frame. An example of a representative 5-layer film structure is shown in TABLE 2. All the Example films had the same layer compositions except for the core layer having varying compositions and components as shown in TABLE 3. The measured properties for the films are shown in TABLE 4.

TABLE 1

Components

| Component Name | MFR [g/10 min] | IV [dl/g] | Brief Description | Commercial Source |
|---|---|---|---|---|
| Equistar XM6030A | 2.0 | / | High density polyethylene ("HDPE") | Equistar Chemicals |
| PP4612 | 2.8 | / | Isotactic homoplypropylene ("PP") | ExxonMobil Chemical Company |
| HCPP4052 | 2.0 | / | High Crystalline PP ("HCPP") | ExxonMobil Chemical Company |
| Ti-Pure R-104 | NA | NA | Titanium dioxide ("$TiO_2$") | DuPont Company |
| Valox ™ 295 | 95 | / | Poly(1,4-butylene terephthalate) ("PBT") | Sabic Innovative Plastics |
| PTT200 | / | 0.92 | Poly(trimethylene terephthalate) ("PTT") | Shell Oil Company |
| PTT503WS | / | 0.82 | | |
| Sorona ® PTT | / | 0.79 | | Du Pont Company |
| XPM 7510 | 5.0 | / | Ethylene-butene-propylene terpolymer ("EPB") | Japan Polypropylene Company |
| Orevac CA100 | 10 | / | Maleated Polypropylene | Arkema Inc. |
| Cloisite ® 15A | NA | NA | Nanoclay ("Nano") | Southern Clay Products, Inc. |
| Irgamod RA20 | NA | NA | Pyromellitic Dianhydride | Ciba Chemicals, Inc. |

TABLE 2

Representative Structure of Example Films

| Layer | Composition | Polymer | Thickness of Layer |
|---|---|---|---|
| Skin | 100% | HDPE | 0.8 μm |
| Tie | 96/4% | Polypropylene/$TiO_2$ | 4.1 |
| Core | 95/6% | Polypropylene/Cavitating Agent | 12.7 |
| Tie | 96/4% | Polypropylene/$TiO_2$ | 4.1 |
| Skin | 100% | EPB Terpolymer | 0.8 |

TABLE 3

Composition of Example Cores

| | Polypropylene | | Cavitating Agent | |
|---|---|---|---|---|
| Example | PP4612 [wt. %] | HCPP4052 [wt. %] | Name | Loading [wt. %] |
| Cx. 1 | 95 | / | Valox ™ 295 | 5 |
| Ex. 2 | 95 | / | PTT200 | 5 |
| Ex. 3 | 95 | / | PTT503WS | 5 |
| Ex. 4 | 95 | / | Sorona ® PTT | 5 |
| Ex. 5 | 93 | / | PTT200 | 7 |
| Ex. 6 | 93 | / | PTT503WS | 7 |
| Ex. 7 | 93 | / | Sorona ® PTT | 7 |
| Ex. 8 | 47.5 | 47.5 | PTT200 | 5 |
| Ex. 9 | 47.5 | 47.5 | PTT503WS | 5 |
| Ex. 10 | 47.5 | 47.5 | Sorona ® PTT | 5 |
| Ex. 11 | 46.5 | 46.5 | PTT200 | 7 |
| Ex. 12 | 46.5 | 46.5 | PTT503WS | 7 |
| Ex. 13 | 46.5 | 46.5 | Sorona ® PTT | 7 |
| Ex. 14 | / | 95 | PTT200 | 5 |
| Ex. 15 | / | 95 | PTT503WS | 5 |
| Ex. 16 | / | 95 | Sorona ® PTT | 5 |
| Ex. 17 | / | 93 | PTT200 | 7 |
| Ex. 18 | / | 93 | PTT503WS | 7 |
| Ex. 19 | / | 93 | Sorona ® PTT | 7 |
| Ex. 20 | / | 89 | Sorona ® PTT/ CA100 | 7/4 |
| Ex. 21 | / | 93 | Sorona ® PTT/ RA20 | 6.9/0.1 |
| Ex. 22 | / | 93 | Sorona ® PTT/ Cloisite ® 15A | 6.7/0.3 |

TABLE 4

Properties and Degree of Build-Up

| Example | Density [g/cm$^3$] | | | Light Transmittance [%] | | | Opacity [%] | | | Build-Up* |
|---|---|---|---|---|---|---|---|---|---|---|
| | MDX: 5.0 | 5.2 | 5.5 | 5.0 | 5.2 | 5.5 | 5.0 | 5.2 | 5.5 | |
| Cx. 1 | 0.639 | 0.597 | 0.566 | 29.5 | 30.2 | 28.2 | 78.0 | 79.1 | 81.6 | 5 |
| Ex. 2 | 0.642 | 0.623 | 0.591 | 31.2 | 29.8 | 29.2 | 76.5 | 78.5 | 79.4 | 3 |
| Ex. 3 | 0.634 | 0.612 | 0.571 | 33.2 | 30.6 | 29.0 | 77.9 | 81.6 | 82.0 | 3 |
| Ex. 4 | 0.625 | 0.616 | 0.564 | 31.3 | 28.2 | 27.7 | 78.2 | 80.4 | 82.2 | 3 |
| Ex. 5 | 0.605 | 0.594 | 0.563 | 30.5 | 28.5 | 27.9 | 77.8 | 81.2 | 81.6 | 3 |
| Ex. 6 | 0.606 | 0.582 | 0.560 | 30.6 | 27.3 | 26.3 | 78.7 | 80.7 | 81.1 | 3 |
| Ex. 7 | 0.582 | 0.566 | 0.548 | 29.0 | 27.8 | 25.7 | 80.0 | 81.9 | 83.6 | 3 |
| Ex. 8 | 0.582 | 0.569 | 0.552 | 27.6 | 26.3 | 25.2 | 81.6 | 82.0 | 83.9 | 3 |
| Ex. 9 | 0.581 | 0.571 | 0.558 | 25.8 | 24.4 | 23.4 | 84.9 | 85.9 | 86.1 | 3 |
| Ex. 10 | 0.576 | 0.550 | 0.539 | 24.4 | 24.2 | 22.1 | 85.3 | 85.2 | 86.3 | 3 |
| Ex. 11 | 0.570 | 0.559 | 0.544 | 27.1 | 24.8 | 23.1 | 82.6 | 83.4 | 87.7 | 3 |
| Ex. 12 | 0.575 | 0.555 | 0.549 | 23.8 | 22.3 | 20.9 | 83.1 | 85.8 | 87.0 | 3 |

TABLE 4-continued

Properties and Degree of Build-Up

| Exam- | Density [g/cm³] | | | Light Transmittance [%] | | | Opacity [%] | | | Build- |
|---|---|---|---|---|---|---|---|---|---|---|
| ple | MDX: 5.0 | 5.2 | 5.5 | 5.0 | 5.2 | 5.5 | 5.0 | 5.2 | 5.5 | Up* |
| Ex. 13 | 0.573 | 0.546 | 0.532 | 24.4 | 22.8 | 20.6 | 84.1 | 85.4 | 88.3 | 3 |
| Ex. 14 | 0.562 | 0.550 | 0.541 | 24.3 | 22.4 | 21.5 | 83.5 | 91.3 | 92.3 | 3 |
| Ex. 15 | 0.562 | 0.556 | 0.534 | 22.0 | 20.9 | 19.6 | 84.9 | 86.6 | 87.4 | 3 |
| Ex. 16 | 0.553 | 0.548 | 0.529 | 20.5 | 19.4 | 18.4 | 87.3 | 88.5 | 89.7 | 3 |
| Ex. 17 | 0.558 | 0.542 | 0.533 | 22.2 | 21.9 | 20.3 | 83.7 | 87.3 | 87.8 | 3 |
| Ex. 18 | 0.555 | 0.543 | 0.528 | 21.5 | 18.8 | 16.1 | 86.7 | 88.6 | 89.7 | 3 |
| Ex. 19 | 0.541 | 0.531 | 0.518 | 20.1 | 17.8 | 17.2 | 87.6 | 88.0 | 89.6 | 3 |
| Ex. 20 | 0.608 | 0.587 | 0.554 | 28.2 | 26.5 | 24.5 | 81.4 | 82.3 | 83.8 | 2 |
| Ex. 21 | 0.596 | 0.593 | 0.568 | 29.5 | 27.8 | 25.1 | 80.5 | 82.5 | 82.7 | 2 |
| Ex. 22 | 0.554 | 0.527 | 0.502 | 19.5 | 18.8 | 16.9 | 86.6 | 92.0 | 93.8 | 2 |

*50/50 wt % polypropylene/cavitating agent.

Comparative Example 1

Example 1 is a comparative example having a blend of 95/5 wt. % PP4612/PBT Valox™ 295 as the core layer (Cx. 1), as shown in TABLE 3. The PBT cavitating agent produced a relatively low density, a relatively low light transmittance, and a relatively high opacity, as shown in TABLE 4. However, the PBT cavitating agent produced a substantial amount of build-up onto the machine surface, as shown in FIG. 2(a).

PBT has a Tg of about 30° C., a density of about 1.34 g/cm³, and an upper processing limit temperature of about 260° C.; whereas PP has a Tg of about −10° C. and a density of about 0.9 g/cm³ that is extruded at about 260° C. In the compression zone of the extruder screw, the PBT pellets were thus found phase-separated by the screw rotation from the PP pellets due to the density difference and then precipitated onto the screw root. The PBT pellets accumulated over time and compacted further by the screw rotation, thus sticking and forming-egg-shell like plate-outs onto the screw. This early-stage plate-out is believed, without being bound by theory, to occur primarily because of the PBT property, that is, a relatively low Tg of about 30° C. and a relatively high Tm of about 225° C., as opposed respectively to about 220° C. of the screw compression zone temperature and to about 160° C. of PP Tm.

During the melt state, it was observed that the PBT phase underwent various degradations, such as thermal breakdown, hydrolysis, and catalytic decomposition, thereby producing a substantial amount of highly reactive low molecular weight species ("LMWS"). These LMWS by-products were short in chain length and underwent a shear gradient during the channel flow, therefore diffusing onto the walls of the extruder barrels and melt lines. It is believed, without being bound by theory, that the build-up of LMWS further accumulated with time due to their molecular and reactive nature and degraded into further lower molecular weight species, leading to plate-out slough off from the metal surface.

Examples 2 to 4

As shown in TABLE 3, the core layers were PP4612 containing 5 wt. % respectively of PTT200 having an IV of about 0.92 dl/g, PTT503WS having an IV of about 0.82 dl/g, and Sorona® PTT having an IV of about 0.79 dl/g. The Example films had a low density, low light transmittance, high opacity, and less build-up than the comparative film of Example 1, as shown in TABLE 4 and FIG. 2(b).

Examples 5 to 7

As shown in TABLE 3, the core layers were PP4612 containing 7 wt. % respectively of PTT200, PTT503WS, and Sorona® PTT. The Example films had a low density, low light transmittance, high opacity, and less build-up than the comparative film of Example 1, as shown in TABLE 4 and FIG. 2(b).

Examples 8 to 10

As shown in TABLE 3, the core layers were 47.5/47.5 wt. % PP4612/HCPP4052 blends containing 5 wt. % respectively of PTT200, PTT503WS, and Sorona® PTT. As shown in TABLE 4, the Example films had a lower density, lower light transmittance, and higher opacity, as compared respectively to the corresponding films of Examples 2 to 4 that employed PP4612 as the core at equivalent process conditions. The Example films also had a lower density, lower light transmittance, higher opacity, and less build-up than the comparative film of Example 1.

Examples 11 to 13

As shown in TABLE 3, the core layers were 46.5/42.5 wt. % PP4612/HCPP4052 blends containing 7 wt. % respectively of PTT200, PTT503WS, and Sorona® PTT. As shown in TABLE 4, the Example films had a lower density, lower light transmittance, and higher opacity, as compared respectively to the corresponding films of Examples 5 to 7 that employed PP4612 as the core at equivalent process conditions. The Example films also had less build-up than the comparative film of Example 1.

Examples 14 to 16

As shown in TABLE 3, the core layers were HCPP4052 blends containing 5 wt. % respectively of PTT200, PTT503WS, and Sorona® PTT. As shown in TABLE 4, the Example films had a lower density, lower light transmittance, and higher opacity, as compared respectively to the corresponding films of Examples 8 to 10 that employed the PP4612/HCPP4052 blend as the core at equivalent process conditions. The Example films also had less build-up than the comparative film of Example 1.

Examples 17 to 19

As shown in TABLE 3, the core layers were HCPP4052 blends containing 7 wt. % respectively of PTT200, PTT503WS, and Sorona® PTT. As shown in TABLE 4, the Example films had a lower density, lower light transmittance, and higher opacity, as compared respectively to the corresponding films of Examples 11 to 13 that employed the PP4612/HCPP4052 blend as the core at equivalent process conditions. The Example films also had less build-up than the comparative film of Example 1.

Examples 20 to 22

The core layer of Example 20 was a 89/7/4 wt. % blend of HCPP4052/Sorona® PTT/Orevac CA 100, as shown in TABLE 3. Orevac CA 100 was a maleic anhydride grafted PP used as a compatibilizer. The core layers of Examples 21 and 22 were HCPP4052 containing the cavitating agent respectively of a 6.9/0.1 wt. % Sorona® PTT/Irgamod RA20 and 6.7/0.3 wt. % Sorona® PTT/Cloisite® 15A. Irgamod RA20 was pyromellitic dianhydride used as a chain extender, and Cloisite® 15A was nanoclay. As shown in TABLE 4 and FIG. 2(c), the Example films had a low density, a low light transmittance, a high opacity, and less build-up than all the other Example films.

Figure 3:
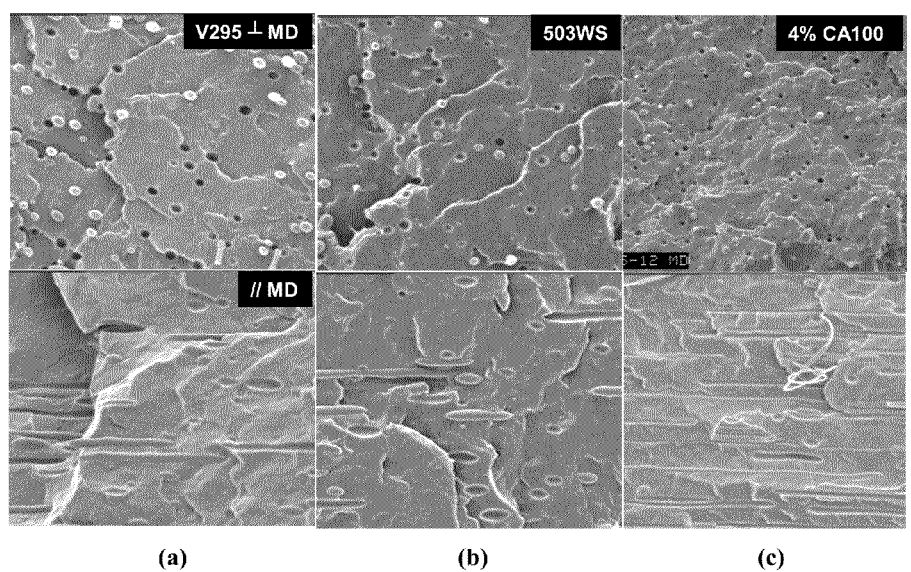
FIG. 3 contains scanning electron microscopy ("SEM") images of cross-sections for the cast sheets of polyolefin/cavitating agent blends illustrated in the Examples: (a) 95/5 wt. % PP4612/PBT Valox™ 295 blend, (b) 95/5 wt. % PP4612/PTT503WS blend, and (c) 89/7/4 wt. % HCPP4052/Sorona® PTT/Orevac CA100 blend. The fresh surface of the cross-section was prepared by freeze fracturing the sheet perpendicular (upper images) and parallel to the machine direction ("MD") (lower images).

FIG. 3 shows the morphology of the PP/cavitating agent blend: (a) 95/5 wt. % PP4612/PBT Valox™ 295, (b) 95/5 wt. % PP4612/PTT 503WS, and (c) 89/7/4 wt. % HCPP4052/Sorona® PTT/Orevac CA100. The SEM images show spherical particles (upper) and fibers (lower) when viewed respectively perpendicular and parallel to the MD. At the equivalent condition, the fibrous morphologies of PBT and PTT were similar having an average dimension of about 2.0 μm in diameter and about 100 μm in length. The morphology of Sorona® PIT containing Orevac CA100 was much finer, having an average dimension of about 1.0 μm in diameter and about 100 in length. This fine dispersion of the compatibilized blend is believed, without being bound by theory, to improve the optical and mechanical uniformity of the Example film.

As demonstrated above, polymeric films in the above examples containing PTT and PTT blends as cavitating agent showed improved processability such as less build-up when compared to PBT and superior properties such as low density, low light transmittance, and high opacity. In addition, polymeric films in the examples using PTT with lower IV generally have lower density, lower light transmittance, and higher opacity than those using PTT with higher IV, while also reducing build-up when compared to PBT. Without being bound by theory, it is believed that the PTT polymer formed less build-up on the extruder screw than the PBT polymer because of its more suitable physical properties as a cavitating agent, that is, higher Tg, higher Tm, and hence higher upper processing limit temperature, which suppressed resin stickiness and degradation at the elevated PP extrusion temperatures. It is also believed that PIT with lower IV was better dispersed and encapsulated within the polypropylene matrix than PTT with higher IV, and thus produced films with generally lower density, lower light transmittance, and higher opacity. It is further believed that the addition of compatibilizers, chain extenders, and nanoparticles to the core layer further suppressed phase separation and resin degradation, thereby reducing the amount of build-up formed onto the machine surface.

All patents and patent applications, test procedures (such as ASTM methods, UL methods, and the like), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The invention has been described above with reference to numerous embodiments and specific examples. Many variations will suggest themselves to those skilled in this art in light of the above detailed description. All such obvious variations are within the full intended scope of the appended claims.

What is claimed is:

1. A polymeric film comprising at least one layer, said layer comprising a polyolefin and at least one cavitating agent comprising a poly(alkylene terephthalate) of formula (I):

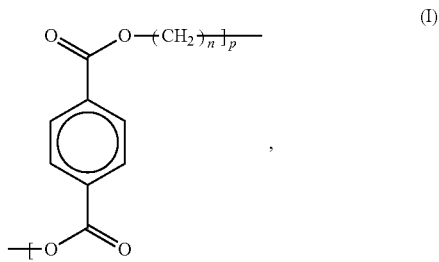

wherein n is 3, p is an integer greater than 1, and the poly(alkylene terephthalate) has an intrinsic viscosity of less than or equal to 0.9 dl/g; wherein the cavitating agent further comprises at least one poly(alkylene terephthalate) of formula (I) wherein n is an integer in the range of 5 to 20.

2. The polymeric film of claim 1, wherein the poly(alkylene terephthalate) has an intrinsic viscosity of less than or equal to about 0.8 dl/g.

3. The polymeric film of claim 1, wherein the poly(alkylene terephthalate) has an intrinsic viscosity of about 0.25 to about 0.8 dl/g.

4. The polymeric film of claim 1, wherein the cavitating agent is in an amount of about 3 to about 60 wt. %, based on the weight of said layer.

5. The polymeric film of claim 1, wherein the polyolefin comprises at least one of polypropylene, polyethylene, ethylene-propylene copolymers, propylene-butene copolymers, ethylene-propylene-butylene terpolymers, or blends thereof.

6. The polymeric film of claim 1, wherein the polyolefin comprises at least one of high density polyethylene, isotactic polypropylene, high crystalline polypropylene, β-nucleated polypropylene, ethylene-propylene copolymers, or blends thereof.

7. The polymeric film of claim 1, wherein the cavitating agent has a glass transition temperature of greater than or equal to about 35° C.

8. The polymeric film of claim 1, wherein the cavitating agent further comprises nanoparticles selected from at least one of nanoclay, rigid polymers having a high glass transition temperature of greater than or equal to about 150° C., cross-linked polymer, metal, metal complex, carbon nanotube, ceramic, ceramic complex, or blends thereof.

9. The polymeric film of claim 1, wherein said layer comprises a polar modified polyolefin selected from at least one of acid or anhydride modified polyolefin, acid or anhydride modified polyolefin copolymers, glycidyl methacrylate modified polyolefin, glycidyl methacrylate modified polyolefin copolymer, ethylene acrylate copolymer, anhydride modified ethylene acrylate copolymer, acid terpolymers containing ester and/or acrylic functionalities, random terpolymer of ethylene, acrylic ester and glycidyl methacrylate, or blends thereof.

10. The polymeric film of claim 1, wherein said layer comprises a chain extender selected from at least one of pyromellitic dianhydride, bisoxazolines, 1,3-phenylenebisoxazoline, 1,4-phenylenebisoxazoline, diepoxides, carbony bis(1-caprolactam), carbodiimides, or blends thereof.

11. The polymeric film of claim 1, wherein the film is opaque.

12. An article of manufacture comprising the polymeric film of claim 1.

13. A polymeric film comprising at least one layer, said layer comprising a polyolefin and at least one cavitating agent comprising a poly(alkylene terephthalate) of formula (I):

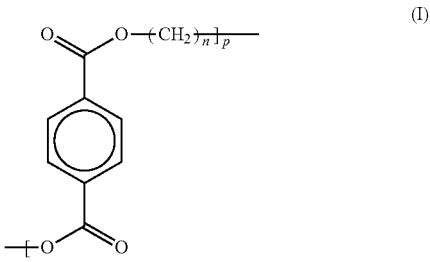

wherein n is 3, p is an integer greater than 1, and the poly(alkylene terephthalate) has an intrinsic viscosity of less than or equal to 0.9 dl/g; wherein said layer comprises a polar modified polyolefin selected from at least one of acid or anhydride modified polyolefin, acid or anhydride modified polyolefin copolymers, glycidyl methacrylate modified polyolefin, glycidyl methacrylate modified polyolefin copolymer, ethylene acrylate copolymer, anhydride modified ethylene acrylate copolymer, acid terpolymers containing ester and/or acrylic functionalities, random terpolymer of ethylene, acrylic ester and glycidyl methacrylate, or blends thereof.

\* \* \* \* \*